United States Patent
Kwon et al.

(10) Patent No.: US 12,277,342 B2
(45) Date of Patent: Apr. 15, 2025

(54) CONTROLLER AND METHOD OF PERFORMING INTERNAL OPERATION THEREOF

(71) Applicant: SK hynix Inc., Gyeonggi-do (KR)

(72) Inventors: Ku Ik Kwon, Gyeonggi-do (KR); Byong Woo Ryu, Gyeonggi-do (KR); Su Ik Park, Gyeonggi-do (KR); Jin Won Jang, Gyeonggi-do (KR); Yong Joon Joo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 113 days.

(21) Appl. No.: 17/506,366

(22) Filed: Oct. 20, 2021

(65) Prior Publication Data

US 2022/0398039 A1    Dec. 15, 2022

(30) Foreign Application Priority Data

Jun. 9, 2021    (KR) .................. 10-2021-0074697

(51) Int. Cl.
*G06F 3/06*    (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 9,298,493 B1* | 3/2016 | Harel | ......................... | G06F 9/46 |
| 11,314,547 B1* | 4/2022 | Tang | ................... | H04L 67/1097 |
| 2017/0206007 A1* | 7/2017 | Shin | ......................... | G06F 3/061 |
| 2017/0277444 A1* | 9/2017 | Canepa | ................... | G06F 3/065 |
| 2017/0308398 A1* | 10/2017 | Pinto | ..................... | G06F 3/0679 |
| 2018/0300084 A1* | 10/2018 | Kachare | ................ | G06F 3/0653 |
| 2019/0073295 A1* | 3/2019 | Lee | ...................... | G06F 12/0253 |
| 2019/0129750 A1* | 5/2019 | Liu | ...................... | G06F 11/3433 |
| 2019/0332326 A1* | 10/2019 | Lv | .......................... | G06F 3/0653 |
| 2020/0026469 A1* | 1/2020 | Gao | .......................... | G06F 3/061 |

FOREIGN PATENT DOCUMENTS

| | | |
|---|---|---|
| KR | 1020140001924 A | 1/2014 |
| KR | 1020180115614 A | 10/2018 |
| KR | 1020180116614 A | 10/2018 |
| KR | 1020200084201 A | 7/2020 |

* cited by examiner

*Primary Examiner* — Tracy A Warren
(74) *Attorney, Agent, or Firm* — IP & T GROUP LLP

(57) ABSTRACT

Disclosed are a controller and an operating method thereof. According to an embodiment of the present disclosure, a controller that controls a memory device, comprises: a host interface for determining a remaining resource index and outputting a task scheduling instruction when a data throughput determined based on data inputted/outputted between a host and the controller is lower than a maximum throughput required under a current workload pattern; and a processor for: selecting, in response to the task scheduling instruction, at least one of a plurality of internal tasks based on the remaining resource index and resource consumption indexes of the respective internal tasks, and performing the selected internal task while performing an input/output task.

20 Claims, 5 Drawing Sheets

| | Priority | | | | Resource consumption index |
|---|---|---|---|---|---|
| | Seq.Read | Seq.Write | Rnd.Read | Rnd.Write | |
| Task1 | High | Low | High | Low | 2 |
| Task2 | Middle | Middle | Middle | Low | 0.2 |
| Task3 | Middle | Middle | Middle | Middle | 1 |
| Task4 | Low | High | Low | Middle | 4 |
| Task5 | Low | High | Low | Low | 2 |
| Task6 | Low | High | Low | High | 0.5 |

CONTROLLER AND METHOD OF PERFORMING INTERNAL OPERATION THEREOF

CROSS-REFERENCE TO RELATED APPLICATION(S)

The present application claims priority under 35 U.S.C. § 119(a) to Korean Patent Application No. 10-2021-0074697, filed on Jun. 9, 2021, the disclosure of which is incorporated herein by reference in its entirety.

BACKGROUND

1. Field

Various embodiments of the present disclosure relate to a controller and an operating method thereof.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a controller capable of performing an internal operation while maintaining I/O performance of a memory system, and an operating method of the controller.

In accordance with an embodiment of the present disclosure, a controller that controls a memory device, comprises: a host interface suitable for determining a remaining resource index and outputting a task scheduling instruction when a data throughput determined based on data inputted/outputted between a host and the controller is lower than a maximum throughput required under a current workload pattern; and a processor suitable for: selecting, in response to the task scheduling instruction, at least one of a plurality of internal tasks based on the remaining resource index and resource consumption indexes of the respective internal tasks, and performing the selected internal task while performing an input/output task.

The processor may select the at least one internal task by: determining internal task candidates each having the resource consumption index equal to or less than the remaining resource index among the plurality of internal tasks, and selecting, as the at least one internal task, an internal task having the highest priority under the current workload pattern among the internal task candidates.

The processor may select the at least one internal task by: changing the remaining resource index based on the resource consumption index of the selected internal task, and selecting, as the at least one internal task, another internal task among the internal task candidates when the changed remaining resource index is greater than "0".

The processor may further be suitable for providing the host interface with a completion response when there are no internal tasks each having the resource consumption index equal to or less than the remaining resource index among the plurality of internal tasks.

The host interface may further be suitable for: monitoring the data throughput when the processor performs the selected internal task, and providing the processor with the task scheduling instruction to repeat the selecting when the data throughput is maintained.

The host interface may further be suitable for: monitoring the data throughput when the processor performs the selected internal task, and providing the processor with a task cancel instruction when the data throughput is reduced. The processor may further be suitable for cancelling a most recently selected internal task in response to the task cancel instruction.

The host interface may further be suitable for providing the processor with a task reset instruction when a change in the current workload pattern is detected. The processor may further be suitable for cancelling all of the selected internal tasks in response to the task reset instruction.

The controller may further comprise a memory suitable for storing the resource consumption index for each of the plurality of internal tasks and a priority for each of the plurality of internal tasks for each workload pattern.

The host interface may determine the remaining resource index based on a ratio of the data throughput and the maximum throughput.

The host interface may determine the data throughput based on an amount of data inputted/outputted for each unit amount of time.

In accordance with an embodiment of the present disclosure, an operating method of a controller that controls a memory device, comprises: determining a data throughput based on data inputted/outputted between a host and the controller; determining a remaining resource index when the determined data throughput is lower than a maximum throughput required under a current workload pattern; selecting at least one of a plurality of internal tasks based on the remaining resource index and resource consumption indexes of the respective internal tasks; and performing the selected internal task while performing an input/output task.

The selecting the at least one internal task may comprise: determining internal task candidates each having the resource consumption index equal to or less than the remaining resource index among the plurality of internal tasks, and selecting, as the at least one internal task, an internal task having the highest priority under the current workload pattern among the internal task candidates.

The selecting the at least one internal task further may comprise: changing the remaining resource index based on the resource consumption index of the selected internal task, and selecting, as the at least one internal task, another internal task among the internal task candidates when the changed remaining resource index is greater than "0".

The selecting is performed until there are no internal tasks each having the resource consumption index equal to or less than the remaining resource index among the plurality of internal tasks.

The operating method may further comprise: monitoring the data throughput when the selected internal task is performed; and repeating the selecting the at least one internal task when the data throughput is maintained.

The operating method may further comprise: monitoring the data throughput when the selected internal task is performed; and canceling a most recently selected internal task when the data throughput is reduced.

The operating method may further comprise canceling all of the selected internal tasks when a change in the current workload pattern is detected.

The operating method may further comprise storing, in a memory, the resource consumption index for each of the plurality of internal tasks and a priority for each of the plurality of internal tasks for each workload pattern.

The determining the remaining resource index is performed based on a ratio of the data throughput and the maximum throughput.

The determining the data throughput is performed based on an amount of data inputted/outputted for each unit amount of time.

In accordance with an embodiment of the present disclosure, an operating method of a controller, comprises: measuring an input/output (IO) resource allocated for an IO task according to a data throughput, the IO resource belonging to a limited total resource; selecting one or more internal tasks according to a priority within a budget of a remaining resource of the total resource while performing the IO task; and performing the selected internal tasks by allocating at least a part of a remaining resource to each of the selected internal tasks while performing the IO task. The IO task is to control a memory device to perform a data IO operation, and the internal task is to control the memory device to perform an internal operation.

DETAILED DESCRIPTION

Hereinafter, various embodiments of the present disclosure will be described in detail with reference to the accompanying drawings.

However, the present disclosure is not limited to the embodiments disclosed below, and may be implemented in various other forms. The disclosed embodiments are provided to make the present disclosure complete and to enable those skilled in the art to fully understand the scope of the present disclosure.

Figure 1:
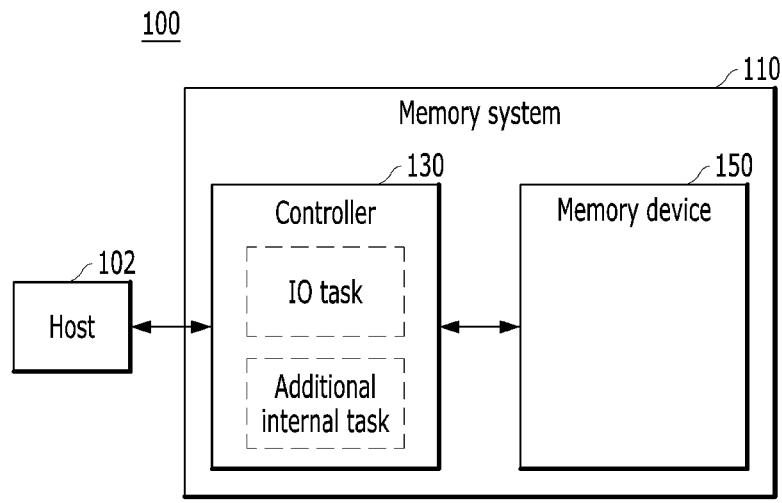
FIG. 1 is a diagram schematically illustrating an example of a data processing system including a memory system in accordance with an embodiment of the present disclosure.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 . . . each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may include a plurality of memory blocks, which may include a single level cell (SLC) memory block storing 1-bit data and/or a multi-level cell (MLC) memory block storing multi-bit data. The SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated.

The controller 130 may control the memory device 150 in response to a request of the host 102. For example, the controller 130 may provide the host 102 with data read from the memory device 150, and store data provided from the host 102 in the memory device 150. For this operation, the controller 130 may control a data input/output (IO) operation such as read, program and erase operations of the memory device 150. Hereinafter, an operation performed by the controller 130 to control the data IO operation of the memory device 150 is referred to as an IO task.

The controller 130 may perform various internal tasks for managing the memory system 110. For example, the internal tasks may include a background task such as a garbage collection (GC) operation, a wear leveling (WL) operation, a map flush operation and a bad block management operation.

The controller 130 may perform the IO task and the internal tasks by using an internal resource. When the data IO operation is performed at a predetermined maximum throughput defined in the memory system 110, most of the internal resource of the controller 130 may be used to perform the IO task.

In some cases, the data IO operation may be performed at a throughput lower than the predetermined maximum throughput. For example, the data IO operation may be performed at the throughput lower than the predetermined maximum throughput according to how the host 102 sets a queue depth of a command queue of the memory system 110. The queue depth may refer to the maximum number of commands that can be queued in the command queue. When the data IO operation is performed at the throughput lower than the maximum throughput, internal resource may remain available additionally for an internal task.

According to an embodiment, the controller 130 may efficiently utilize the internal resource by performing the internal tasks using the remaining internal resource while the IO task is performed.

The controller 130 may monitor the data throughput due to the data IO operation of the memory system 110, and analyze a workload pattern. The workload pattern may include types of data IO such as a read pattern and a write pattern, and data attributes such as a sequential pattern and a random pattern. When a data throughput due to the current data IO operation is lower than a maximum throughput required under a current workload pattern, the controller 130 may determine a remaining internal resource of the controller 130 based on the data throughput due to the current data IO operation and the maximum throughput required under the current workload pattern. While performing the IO task, the controller 130 may additionally perform the internal tasks by using the remaining internal resource. Specifically, the controller 130 may select an internal task having the highest priority under the current workload pattern from among the internal tasks that can be performed using the remaining internal resource, and additionally perform the selected internal task.

The controller 130 according to the present embodiment is described in detail with reference to FIGS. 2 to 6.

Figure 2:
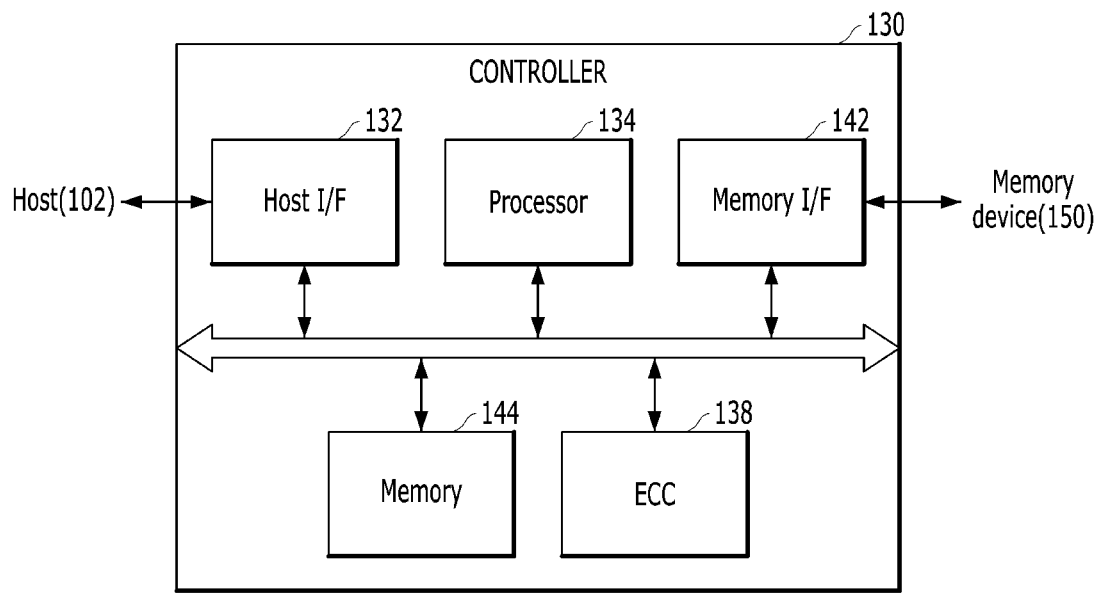
FIG. 2 is a diagram illustrating a controller in accordance with an embodiment of the present disclosure.

FIG. 2 is a diagram illustrating a controller 130 in accordance with an embodiment of the present disclosure.

The controller 130 of FIG. 2 may correspond to the controller 130 described with reference to FIG. 1. The controller 130 may include a host interface (I/F) 132, a processor 134, an error correction code (ECC) 138, a memory interface (I/F) 142 and a memory 144, all operatively coupled via an internal bus.

The host I/F 132 may be configured to process a command and data of the host 102, and may communicate with the host 102 through one or more of various communication standards or interfaces such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host I/F 132 may drive firmware referred to as a host interface layer (HIL) in order to exchange data with the host 102.

The ECC component 138 may detect and correct an error contained in the data read from the memory device 150. In other words, the ECC component 138 may perform an error correction decoding process to the data read from the memory device 150 through an ECC value used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific structure. The ECC component 138 may include all circuits, modules, systems or devices for error correction.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may drive firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 illustrates the memory 144 disposed within the controller 130. In an embodiment, the memory 144 may be implemented as an external volatile memory device, and the memory 144 may have a memory interface for inputting and outputting data to and from the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

The processor 134 may drive a flash translation layer (FTL) and perform a data IO operation corresponding to a request received from the host 102. For example, the processor 134 may control a write operation of the memory device 150 in response to a write request from the host 102, and control a read operation of the memory device 150 in response to a read request from the host 102.

Also, the controller 130 may perform an internal operation on the memory device 150 through the processor 134, which is realized as a microprocessor or a central processing unit (CPU).

Figures 3, 4:
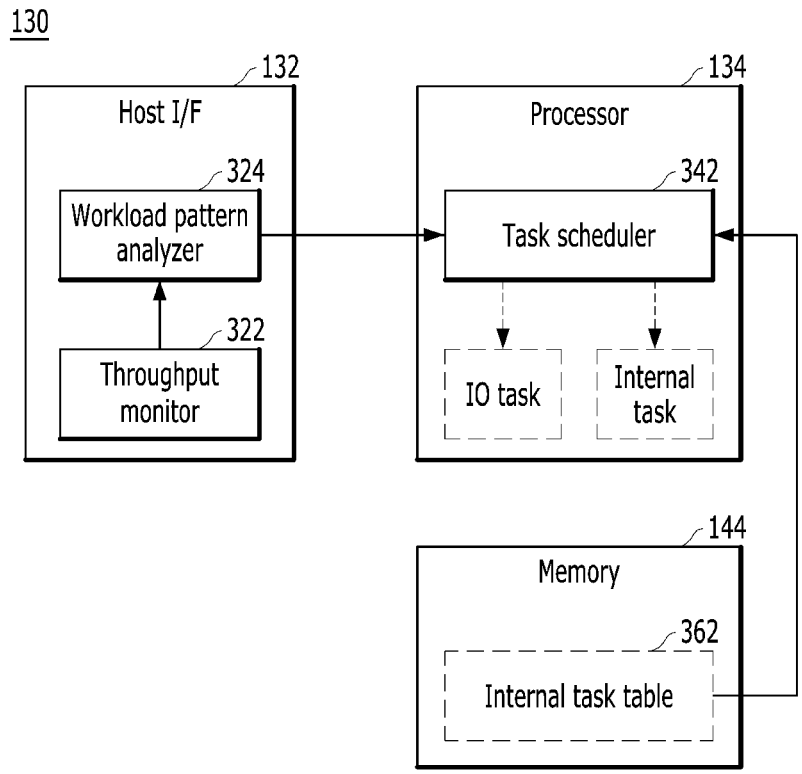
FIG. 3 is a diagram illustrating in detail an operation of the controller in accordance with an embodiment of the present disclosure.
FIG. 4 is a diagram illustrating an example of an internal task table in accordance with an embodiment of the present disclosure.

FIG. 3 is a diagram illustrating in detail an operation of the controller 130 in accordance with an embodiment of the present disclosure.

FIG. 3 illustrates a host interface (I/F) 132, a processor 134 and a memory 144 among components of the controller 130. The host I/F 132, the processor 134 and the memory 144 correspond to those described with reference to FIG. 2.

The host I/F 132 may include a throughput monitor 322 and a workload pattern analyzer 324.

The throughput monitor 322 may monitor a data throughput due to the data IO operation of the memory system 110. For example, the throughput monitor 322 may monitor an amount of write data inputted from the host 102 and an amount of read data outputted to the host 102. The throughput monitor 322 may determine the data throughput due to the data IO operation based on the amount of write data per unit amount of time and the amount of read data per unit amount of time.

The workload pattern analyzer 324 may determine a workload pattern based on the amount of write data and the amount of read data monitored by the throughput monitor 322. Types of the workload pattern may include a sequential read pattern, a sequential write pattern, a random read pattern and a random write pattern. A maximum throughput required for the memory system 110 may vary according to the workload pattern.

The workload pattern analyzer 324 may determine whether a data throughput due to the current data IO operation obtained from the throughput monitor 322 is lower than the maximum throughput required under a current workload pattern. When the data throughput due to the current data IO operation is lower than the maximum throughput required under the current workload pattern, the internal resource may remain in the controller 130. The controller 130 may use the remaining internal resource to perform internal tasks.

The workload pattern analyzer 324 may determine a remaining resource index of the controller 130. The remaining resource index, which is an index that can roughly represent the remaining internal resource of the controller 130, may be determined based on the data throughput due to the current data IO operation and the maximum throughput required under the current workload pattern. For example, when the data throughput due to the current data IO operation corresponds to 70% of the maximum throughput required under the current workload pattern, the internal resource corresponding to approximately 30% of the total internal resource of the controller 130 may remain. The total amount of the internal resource of the controller 130 may be expressed as a predetermined constant, for example, "10". When the data throughput due to the current data IO operation corresponds to 70% of the maximum throughput required under the current workload pattern, the remaining resource index may be determined as "3" corresponding to 30% of "10".

Depending on implementations, the throughput monitor 322 may be implemented as hardware on a controller chip, and the workload pattern analyzer 324 may be implemented as firmware loaded into the memory 144 and driven in the host I/F 132. However, the present disclosure is not limited thereto.

The processor 134 may include a task scheduler 342. The task scheduler 342 may select an internal task to be performed while performing the IO task, based on a change in a workload pattern and a change in a data throughput due to the data IO operation, or cancel the selected internal task. For example, the task scheduler 342 may obtain information about the current workload pattern and the remaining internal resource from the workload pattern analyzer 324. The task scheduler 342 may determine to additionally perform an internal task having a high priority under the current workload pattern among the internal tasks that can be performed using the remaining internal resource.

The task scheduler 342, which is implemented as firmware, may be loaded into the memory 144 and driven in the processor 134, but the present disclosure is not limited thereto.

The memory 144 may store an internal task table 362. The controller 130 may perform various types of internal tasks. The internal task table 362 may include a resource consumption index and priority for each internal task. The resource consumption index of an internal task is an index that can roughly represent the amount of the internal resource that is expected to be consumed for the internal task when the internal task is performed by the controller 130. The internal task table 362 may be stored in the memory device 150, and loaded into the memory 144 when the memory system 110 is booted up.

FIG. 4 is a diagram illustrating an example of the internal task table 362 according to an embodiment of the present disclosure.

Rows of the internal task table 362 represent respective internal tasks Task1 to Task6. Columns of the internal task table 362 represent a priority ("High", "Middle" and "Low") depending on each workload pattern ("Seq.Read", "Seq.Write", "Rnd.Read" and "Rnd.Write") and a resource consumption index, for the internal tasks Task1 to Task6.

The resource consumption index of an internal task may be determined based on the amount of the internal resource that is expected to be consumed for the internal task when performing the internal task. When the total amount of the internal resource of the controller 130 is "10", and 20% of the total amount of the internal resource is expected to be consumed for a specific internal task when performing the specific internal task, the resource consumption index of the specific internal task may be determined as "2" corresponding to 20% of "10".

The task scheduler 342 may select an internal task to be additionally performed based on the remaining resource index and the resource consumption index of each internal task. For example, when the remaining resource index is "3", at least one of internal tasks having the resource consumption index of "3" or less may be selected.

When there are several internal tasks each having the resource consumption index less than or equal to the current remaining resource index, an internal task having a higher priority may be selected first. In FIG. 4, the priority of each internal task for each workload pattern is indicated as one of "High", "Middle" and "Low". The priority of each internal task may vary depending on the workload pattern. The priority of each internal task for each workload pattern may be determined in advance according to the policy.

As a first example, when the workload pattern is a random write pattern ("Rnd.Write"), a garbage collection task may have the highest priority. While a random write operation is performed, the number of free blocks, which are memory blocks in an erase state, may be decreased. When the garbage collection task is additionally performed while the IO task in the random write pattern is performed, the decrease in the number of free blocks may be alleviated. When the decrease in the number of free blocks is alleviated, it may be prevented that a throughput of the write operation is reduced due to the garbage collection task being excessively performed while the write operation is performed.

As a second example, when the workload pattern is a sequential read pattern ("Seq.Read") or a random read pattern ("Rnd.Read"), a read reclaim task may have the highest priority. In order to maintain reliability of data stored in a memory block, the read reclaim task may include subtasks for correcting an error of the data while loading the data into the memory 144 and programming the error-corrected data into another memory block. When the read reclaim task is performed while a read operation is performed, the reliability of data to be read may be maintained.

As a third example, when the workload pattern is a sequential write pattern ("Seq.Write"), a migration task may have the highest priority. The controller 130 may preferentially program write data received from the host 102 into an SLC memory block of the memory device 150, and then migrate and program the programmed write data into an MLC memory block, in order to provide the host 102 with high sequential write performance. The migration task may include an operation of migrating and programming the programmed write data into the MLC memory block. When the controller 130 has the remaining internal resource, the controller 130 may perform the migration task while a sequential write operation is performed.

According to an embodiment, when the data throughput due to the current data IO operation is lower than the maximum throughput required under the current workload pattern, the controller 130 may additionally perform the internal tasks together with the IO task by using the remaining internal resource of the controller 130. For example, the controller 130 may additionally perform an internal task, which may be performed under the remaining internal resource of the controller 130 and has the highest priority under the current workload pattern.

Hereinafter, a method of selecting, by the controller 130, internal tasks to be additionally performed while the IO task is performed is described in detail with reference to FIGS. 5A, 5B and 6.

Figure 5A:
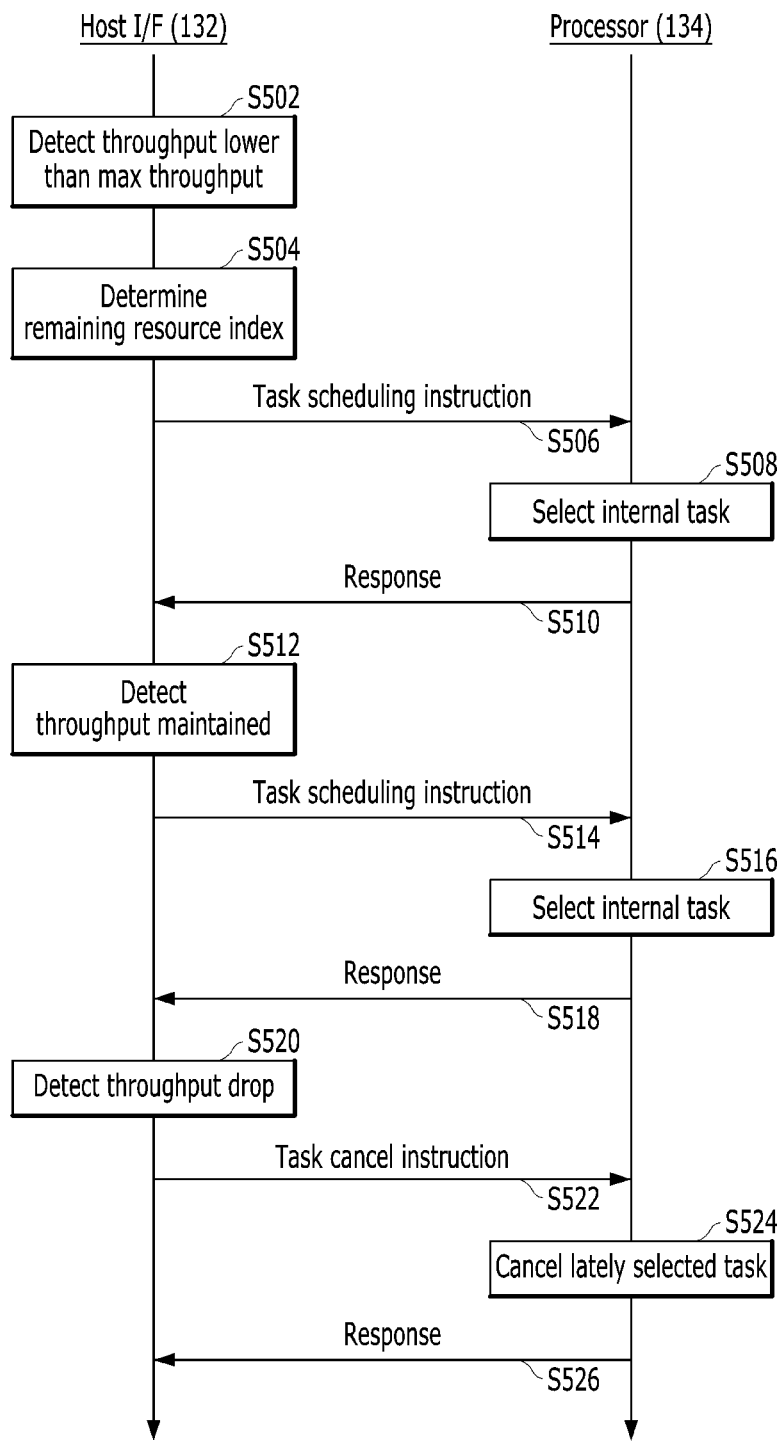
FIGS. 5A and 5B are diagrams illustrating a transaction between a host interface and a processor in accordance with an embodiment of the present disclosure.

FIG. 5A is a diagram illustrating a transaction between the host I/F 132 and the processor 134 for performing task scheduling in accordance with an embodiment of the present disclosure.

In operation S502, the host I/F 132 may detect a state in which a data throughput due to the current data IO operation is lower than a maximum throughput required under a current workload pattern.

In operation S504, the host I/F 132 may determine a remaining resource index based on the data throughput due to the current data IO operation and the maximum throughput required under the current workload pattern.

In operation S506, the host I/F 132 may provide the processor 134 with a task scheduling instruction. The task scheduling instruction may refer to a command instructing the processor 134 to select internal tasks to be additionally performed while a current IO task is performed. The host I/F 132 may provide the processor 134 with the remaining resource index and workload pattern information together with the task scheduling instruction.

In operation S508, the processor 134 may select the internal tasks to be performed while the current IO task is performed, in response to the task scheduling instruction. The processor 134 may select one or more internal tasks from among various types of internal tasks that are to be performed by the controller 130. An example of a method of selecting the internal tasks by the processor 134 is described below with reference to FIG. 6.

When the selection of the internal tasks is completed, the processor 134 may provide the host I/F 132 with a response and perform the selected internal tasks while performing the IO task, in operation S510.

In response to the response, the host I/F 132 may monitor performance of the processor 134 when the processor 134 performs the selected internal tasks together with the IO task. When the controller 130 still has remaining internal resource even though the controller 130 performs the selected internal tasks together with the IO task, a data throughput due to the data IO operation may be maintained. Operations S512, S514, S516 and S518 represent operations when the data throughput due to the data IO operation is maintained.

In operation S512, the host I/F 132 may detect a state in which the data throughput due to the data IO operation is maintained while the selected internal tasks are performed. When the data throughput due to the data IO operation is still maintained, the internal resource may still remain in the controller 130. When the controller 130 can perform still further internal tasks using the remaining internal resource, the resource of the controller 130 may be used more efficiently.

In operation S514, the host I/F 132 may provide the processor 134 with a task scheduling instruction to instruct the processor 134 to further add internal tasks.

In operation S516, the processor 134 may further add internal tasks to be performed while the current IO task is performed, in response to the task scheduling instruction.

In operation S518, the processor 134 may provide the host I/F 132 with a response to the task scheduling instruction.

The host I/F 132 may monitor the data throughput due to the data IO operation of the memory system 110 in response to the response.

When the controller 130 excessively uses the internal resource to perform internal tasks, the internal resource that is used for an IO task may be reduced, and a data throughput due to the data IO operation may drop. Operations S520, S522, S524 and S526 represent operations when the data throughput due to the data IO operation drops.

In operation S520, the host I/F 132 may detect a state in which the data throughput due to the data IO operation drops after the internal tasks are added. When the data IO performance is degraded, the controller 130 may recover the data throughput due to the data IO operation by canceling the added internal tasks.

In operation S522, the host I/F 132 may provide the processor 134 with a task cancel instruction.

In operation S524, the processor 134 may cancel the most recently added internal tasks in response to the task cancel instruction. When at least some of the internal tasks are canceled, resource consumption of the controller 130 may be reduced, and thus the data throughput due to the data IO operation may be recovered.

In operation S526, the processor 134 may provide the host I/F 132 with a response to the task cancel instruction.

According to a command provided from the host 102, the types of data IO and data attributes may vary, and the workload pattern may be changed. As the workload pattern is changed, the maximum throughput required under the changed workload pattern may also be changed, and the priorities of internal tasks may also be changed. Accordingly, when existing internal tasks are continuously performed even though the workload pattern is changed, performance of the memory system 110 may deteriorate. The controller 130 may reset task scheduling when the workload pattern is changed.

Figure 5B:
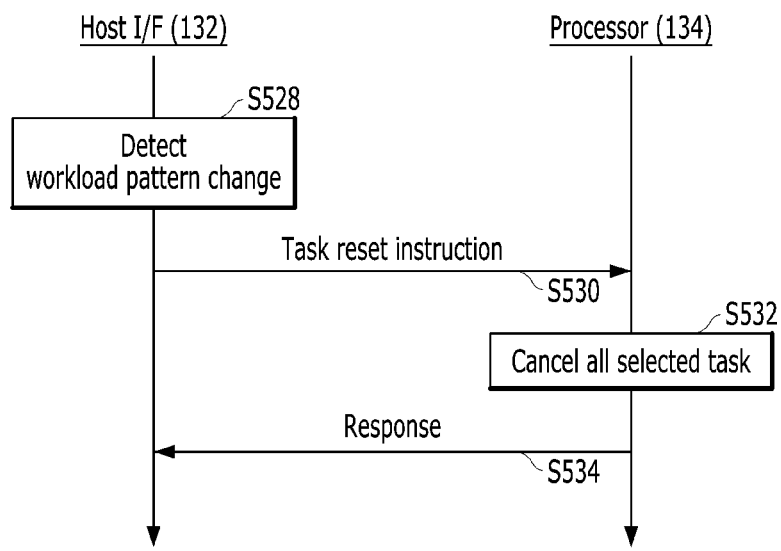

FIG. 5B is a diagram illustrating a transaction between the host I/F 132 and the processor 134 for resetting task scheduling in accordance with an embodiment of the present disclosure.

In operation S528, the host I/F 132 may detect a workload pattern change.

In operation S530, the host I/F 132 may provide the processor 134 with a task reset instruction.

In operation S532, the processor 134 may cancel all of the internal tasks added in operations S508 and S516, in response to the task reset instruction.

In operation S534, the processor 134 may provide the host I/F 132 with a response to the task reset instruction.

In a state in which all of the added internal tasks are canceled, when the data throughput due to the current data IO operation is lower than the maximum throughput required under the changed workload pattern, the internal resource may remain in the controller 130. When the data throughput due to the current data IO operation is lower than the maximum throughput required under the current workload pattern, the controller 130 may perform the operations again from operation S502 of FIG. 5A.

Hereinafter, a method of selecting, by the processor 134, the internal tasks to be added according to an embodiment is described with reference to FIG. 6.

Figure 6:
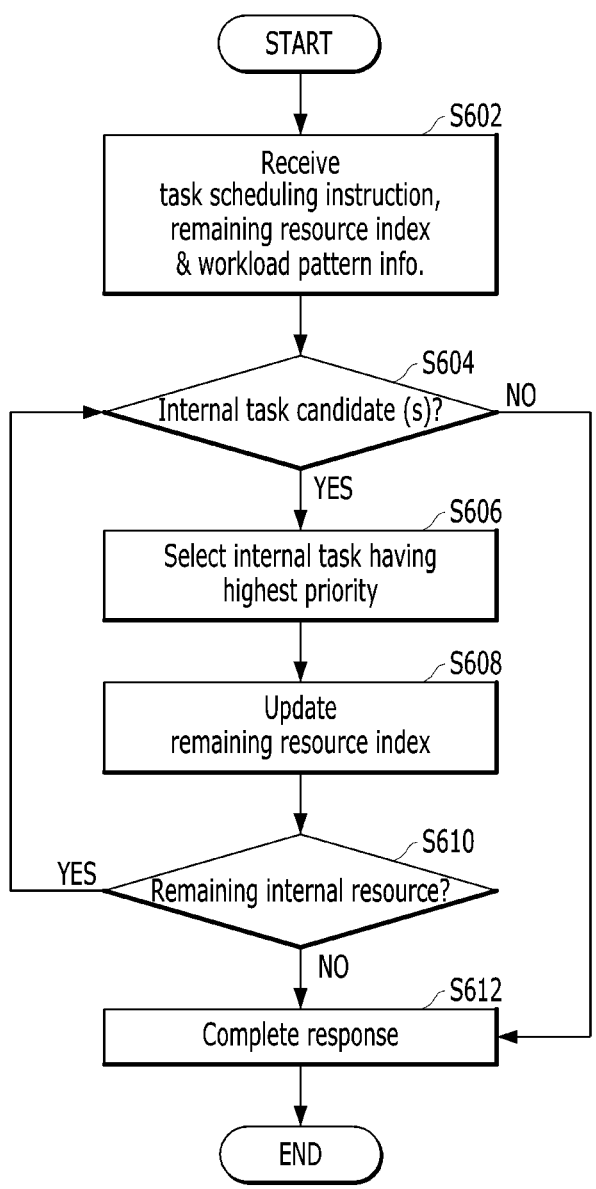
FIG. 6 is a diagram illustrating an operation of the processor in accordance with an embodiment of the present disclosure.

FIG. 6 is a diagram illustrating an operation of the processor 134 in accordance with an embodiment of the present disclosure.

In operation S602, the processor 134 may receive a task scheduling instruction, a remaining resource index and workload pattern information from the host I/F 132. Operation S602 may correspond to operation S506 or S514 of FIG. 5A.

In operation S604, the processor 134 may determine whether internal task candidates that can be added are present. For example, the processor 134 may determine, as the internal task candidates, one or more internal tasks each having a resource consumption index equal to or less than the remaining resource index among various internal tasks of the internal task table 362.

When the internal task candidates are not present (that is, "NO" in operation S604), the processor 134 may provide the host I/F 132 with a completion response without selecting internal tasks, in operation S612. Operation S612 may correspond to operation S510 or S518 of FIG. 5A.

When one or more internal task candidates are present (that is, "YES" in operation S604), the processor 134 may select internal tasks each having the highest priority among the internal task candidates, in operation S606.

In operation S608, the processor 134 may update the remaining resource index based on the resource consumption index of each of the added internal tasks. For example, when the remaining resource index is "3" and the resource consumption index of the selected internal task is "2", the remaining resource index may be updated to "1" obtained by subtracting the resource consumption index from the remaining resource index.

In operation S610, the processor 134 may determine whether the internal resource still remains in the controller 130. For example, the processor 134 may determine whether the remaining resource index is greater than a predetermined value, for example, "0".

When the remaining internal resource remains in the controller 130 (that is, "YES" in operation S610), the processor 134 may further select internal tasks by performing operation S604 again.

When the remaining internal resource does not remain in the controller 130 (that is, "NO" in operation S610), the processor 134 may provide the host I/F 132 with a completion response in operation S612.

According to an embodiment, the controller 130 may determine the remaining resource index when the data throughput due to the data IO operation is lower than the maximum throughput required under the current workload pattern, and select at least one of a plurality of internal tasks based on the remaining resource index, the resource consumption indexes of the plurality of internal tasks and the priorities of the internal tasks for each workload pattern.

The controller 130 may efficiently use the internal resource by further performing the selected internal task while performing the IO task. In addition, when the selected internal task is performed, the reliability or lifespan of the memory system 110 may be improved, and the data throughput due to the data IO operation may be maintained.

According to embodiments of the present disclosure, it is possible to provide a controller and an operating method thereof that may perform an internal operation while maintaining I/O performance of a memory system.

Although the controller and the operating method thereof according to the embodiments have been described with respect to specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure.

What is claimed is:

1. A controller that controls a memory device, comprising:
    a host interface suitable for determining a remaining resource index and outputting a task scheduling instruction when a data throughput determined based on data inputted/outputted between a host and the controller is lower than a maximum throughput required under a current workload pattern; and
    a processor suitable for:
    selecting, in response to the task scheduling instruction, at least one internal task having a highest priority among a plurality of internal tasks based on the remaining resource index, resource consumption indexes of the respective plurality of internal tasks, and the current workload pattern, wherein priorities of the at least one of the plurality of internal tasks selected vary depending on the current workload pattern, and
    performing the selected at least one internal task having the highest priority under the current workload pattern while performing an input/output task,
    wherein the current workload pattern includes a data type and a data attribute of the data inputted/outputted between the host and the controller,
    wherein the data type includes a read pattern and a write pattern,
    wherein the data attribute includes a sequential pattern and a random pattern.

2. The controller of claim 1, wherein the processor selects the at least one internal task by:
    determining internal task candidates each having the resource consumption index equal to or less than the remaining resource index among the plurality of internal tasks, and
    selecting, as the at least one internal task, the internal task having the highest priority under the current workload pattern of the data inputted/outputted among the internal task candidates.

3. The controller of claim 2, wherein the processor selects the at least one internal task further by:
    changing the remaining resource index based on the resource consumption index of the selected internal task, and
    selecting, as the at least one internal task, another internal task among the internal task candidates when the changed remaining resource index is greater than "0".

4. The controller of claim 3, wherein the processor is further suitable for providing the host interface with a completion response when there are no internal tasks each having the resource consumption index equal to or less than the remaining resource index among the plurality of internal tasks.

5. The controller of claim 1, wherein the host interface is further suitable for:
    monitoring the data throughput when the processor performs the selected internal task, and
    providing the processor with the task scheduling instruction to repeat the selecting when the data throughput is maintained.

6. The controller of claim 1,
    wherein the host interface is further suitable for:
    monitoring the data throughput when the processor performs the selected internal task, and
    providing the processor with a task cancel instruction when the data throughput is reduced after the performing of the internal task, and
    wherein the processor is further suitable for cancelling a most recently selected internal task in response to the task cancel instruction.

7. The controller of claim 1,
    wherein the host interface is further suitable for providing the processor with a task reset instruction when a change in the current workload pattern is detected, and
    wherein the processor is further suitable for cancelling all of the selected internal tasks in response to the task reset instruction.

8. The controller of claim 2, further comprising a memory suitable for storing the resource consumption index for each of the plurality of internal tasks and a priority for each of the plurality of internal tasks for each workload pattern.

9. The controller of claim 1, wherein the host interface determines the remaining resource index based on a ratio of the data throughput and the maximum throughput.

10. The controller of claim 1, wherein the host interface determines the data throughput based on an amount of data inputted/outputted for each unit amount of time.

11. An operating method of a controller that controls a memory device, the operating method comprising:
    determining a data throughput based on data inputted/outputted between a host and the controller;
    determining a remaining resource index when the determined data throughput is lower than a maximum throughput required under a current workload pattern;
    selecting at least one internal task having a highest priority among a plurality of internal tasks based on the remaining resource index, resource consumption indexes of the respective plurality of internal tasks, and the highest priority depending on the current workload pattern for the plurality of internal tasks, wherein priorities of the at least one of the plurality of internal tasks selected vary depending on the current workload pattern; and performing the selected at least one internal task having the highest priority under the current workload pattern while performing an input/output task, wherein the current workload pattern includes a data type and a data attribute of the data inputted/outputted between the host and the controller, wherein the data type includes a read pattern and a write pattern, wherein the data attribute includes a sequential pattern and a random pattern.

12. The operating method of claim 11, wherein the selecting the at least one internal task comprises:

determining internal task candidates each having the resource consumption index equal to or less than the remaining resource index among the plurality of internal tasks, and selecting, as the at least one internal task, the internal task having the highest priority under the current workload pattern of the data inputted/outputted among the internal task candidates.

13. The operating method of claim 12, wherein the selecting the at least one internal task further comprises:

changing the remaining resource index based on the resource consumption index of the selected internal task, and selecting, as the at least one internal task, another internal task among the internal task candidates when the changed remaining resource index is greater than "0".

14. The operating method of claim 13, wherein the selecting is performed until there are no internal tasks each having the resource consumption index equal to or less than the remaining resource index among the plurality of internal tasks.

15. The operating method of claim 11, further comprising:

monitoring the data throughput when the selected internal task is performed; and repeating the selecting the at least one internal task when the data throughput is maintained.

16. The operating method of claim 11, further comprising:

monitoring the data throughput when the selected internal task is performed; and canceling a most recently selected internal task when the data throughput is reduced after the performing of the internal task.

17. The operating method of claim 11, further comprising canceling all of the selected internal tasks when a change in the current workload pattern is detected.

18. The operating method of claim 12, further comprising storing, in a memory, the resource consumption index for each of the plurality of internal tasks and a priority for each of the plurality of internal tasks for each workload pattern.

19. The operating method of claim 11, wherein the determining the remaining resource index is performed based on a ratio of the data throughput and the maximum throughput.

20. An operating method of a controller, the operating method comprising:

measuring an input/output (IO) resource allocated for an IO task according to a data throughput based on data inputted/outputted, the IO resource belonging to a limited total resource required under a current workload pattern;

selecting at least one internal task among a plurality of internal tasks according to a priority within a budget of a remaining resource of the limited total resource while performing the IO task and giving the highest priority to the at least one internal task related to the current workload pattern of the data inputted/outputted, among the plurality of internal tasks, wherein priorities of the at least one internal task of the plurality of internal tasks selected vary depending on the current workload pattern; and performing the selected at least one internal task having the highest priority under the current workload pattern by allocating at least a part of the budget of the remaining resource to each of the selected one or more internal tasks while performing the IO task, wherein the IO task is to control a memory device to perform a data IO operation, and wherein the plurality of internal tasks is to control the memory device to perform an internal operation, wherein the current workload pattern includes a data type and a data attribute of the data inputted/outputted between the host and the controller, wherein the data type includes a read pattern and a write pattern, wherein the data attribute includes a sequential pattern and a random pattern.

* * * * *